Nov. 5, 1940.　　B. L. DOLBEAR ET AL　　2,220,087

DIRECTION FINDING

Filed July 7, 1936　　2 Sheets-Sheet 1

INVENTORS
B. L. DOLBEAR AND
W. S. WEBSTER
BY
ATTORNEY

Nov. 5, 1940.                B. L. DOLBEAR ET AL                    2,220,087
                               DIRECTION FINDING
                             Filed July 7, 1936            2 Sheets—Sheet 2
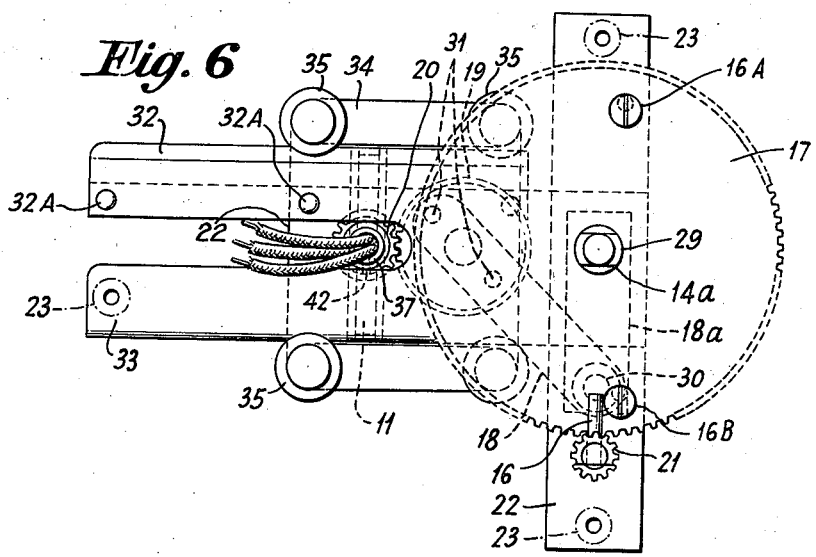
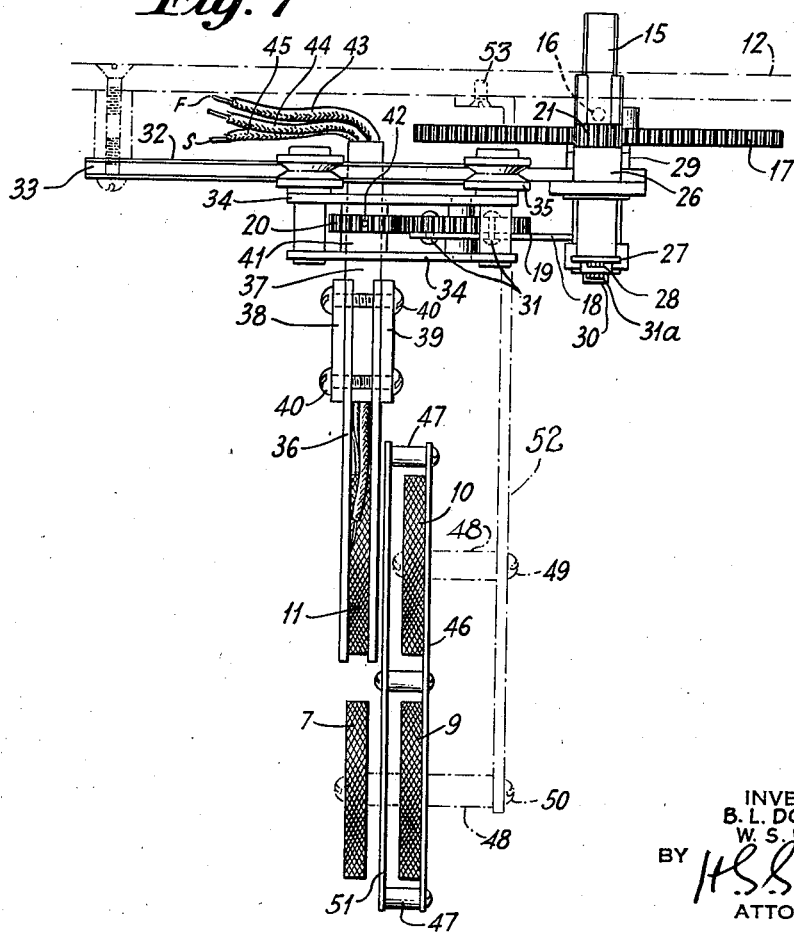
INVENTORS
B. L. DOLBEAR AND
W. S. WEBSTER
BY
ATTORNEY Patented Nov. 5, 1940

2,220,087

UNITED STATES PATENT OFFICE 2,220,087

DIRECTION FINDING

Benjamin L. Dolbear, Belmont, Mass., and William S. Webster, Palmyra, N. J., assignors to Radio Corporation of America, a corporation of Delaware Application July 7, 1936, Serial No. 89,280

9 Claims. (Cl. 250—11)

This invention relates to novel improvements in radio direction finder balancers and sense determining circuits and is particularly adapted to direction finders operating in the medium wave length bands.

The object of this invention is to simplify improved direction finder balancers and sense determining methods generally.

Another object of this invention is to provide a direction finder balancer in which the degree of energy coupling from the open antenna into the loop circuit in either direction is more easily controlled and without undesired coupling being present.

A feature of this invention is the novel mechanical arrangement of the coupling coil wherein the coil is moved from a maximum coupling position in one direction through a minimum coupling position, then to a maximum coupling position in the reverse direction.

Still another feature of this invention is the application of the balancing operations to only one side of a balanced loop circuit and using the other side of the loop circuit for sense determinations.

In the art of radio direction finding using a balanced rotatable coil or loop antenna, it is well known that directional indications are much better defined when the rotatable loop antenna is used in a position of minimum signal pickup than when in the maximum position. Therefore, this invention is directed to direction finder circuits employing the minimum signal pickup and to improve the desired nulls of the incoming signals.

When directional receiving antennae are employed at locations free from surrounding electrical conducting objects, such as might exist in a large open field, it will be found that satisfactory null signal or bearing indications are usually obtainable.

In many cases when the direction finder is used in the vicinity of conducting objects such as steel frame building, large trees, wires, masts, metal stacks and stays, the null indications are indefinite or obscure due to a residual signal so that a desired complete null is never evident.

This phenomenon is known to be due usually to signal currents set up in such nearby vertical conducting objects which, although very small, induce in the loop antenna spurious voltages that not only persist when the loop is in the null position, but such voltages are vectorially in quadrature phase with the desired voltages directly induced by the signal in the loop antenna.

One method of eliminating this interfering residual signal is to introduce into the loop circuit an equal and opposite voltage of proper phase to cancel out the spurious undesired voltage.

Such voltage may be obtained from a vertical antenna which may be raised in the vicinity of the direction finder and properly connected to a coupling system to transfer electrical energy into the loop circuit.

As the relative phase and magnitude of the spurious voltages changes with the angle of loop rotation, it becomes necessary to provide means for varying both direction and amplitude of the coupled voltage from the open antenna into the loop circuit. A method of accomplishing this is to be described in this application.

The loop antenna when used alone will determine the plane of propagation of the signal but it does not discriminate between the correct bearing of the signal source and its reciprocal bearing.

One method of determining which one of the two bearings is correct, employs a non-directional antenna such as a single vertical wire, in addition to the loop antenna. The signal picked up by this non-directional antenna is coupled at radio frequency to that picked up by loop antenna. When the loop is rotated to one side of the null position, it is found that the two incoming signals from the loop and vertical antenna combine in an additive manner producing a signal response greater than with the loop alone. If the loop is turned to the other side of the same null position, the loop voltage reverses with respect to the non-directional antenna voltage and a differential summation of the two voltages results producing a decrease in signal response from that of the loop alone.

As it is customary in most cases to tune the directional or loop antenna to resonance in order to benefit by the magnification of received signal voltages, it is important that the circuit of the non-directional antenna shall have the proper electrical constants to produce the desired phase and amplitude.

For correct functioning to balance out residual signal and clarify directional nulls, the open antenna voltage induced into the loop circuit must be ninety degrees out of phase vectorially with signal voltages picked up directly by the loop antenna.

On the other hand, for sense of direction determination, the open antenna voltages induced into the loop circuit must be either in phase with the loop signals or one hundred and eighty degrees out of phase vectorially.

For balancing purposes, the vertical antenna must be detuned from the signal frequency a sufficient amount to produce the desired phase difference.

For sense determining purposes, the open antenna is tuned to the signal frequency and its amplitude is controlled by resistance in the circuit resulting in the desired phase and magnitude of signal response.

The above described methods of producing desired effects in the circuits are known in the prior art of radio direction finding and are described in Keen's "Wireless Direction Finding," second edition, pgs. 65, 66 and 67, and in a United States Pat. #1,868,982, issued to Fred H. Kroger.

This invention will best be understood by reference to the accompanying drawings, in which:

Fig. 6 is a front elevation of the balancer with the panel removed; while

Fig. 7 is a side view of Fig. 6.

Figure 1:
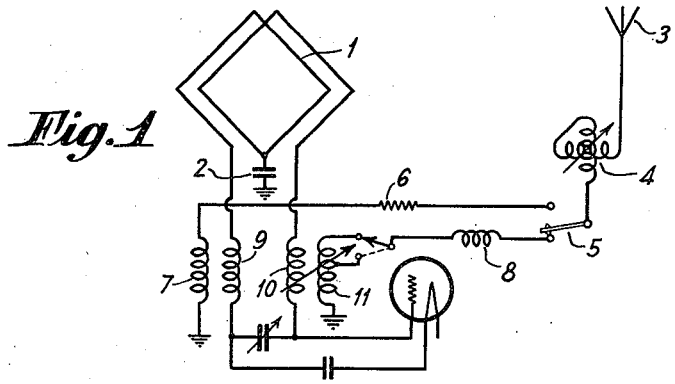
Fig. 1 shows a schematic wiring diagram of the loop and balancer circuit and the associated open antenna circuit coupled thereto.

Referring now to Fig. 1 of the drawings, the ordinary loop is shown indicated at 1 and is grounded at the central portion thereof. If it is desired to isolate loop 1 from any direct current it may be grounded through a condenser 2. The open antenna is indicated at 3 and is connected to a variable tuning inductance shown in the form of a variometer 4. An inductance coil 8 is provided to normally detune the antenna circuit when balancing operations are performed through coupling coil 11. Sense switch 5, is normally in the position shown, but when operated to give a sense of direction, connects the antenna 3 in series with resistance 6, which is included in the sense circuit to produce a desired phase difference and also to limit the amount of energy coming from antenna 3 to sense coil 7. Members 9 and 10 are loop coupling inductance coils. Coil 10 is coupled to a variable coupling coil 11, this coil being arranged to slide and also rotate in a manner so as to couple energy in either direction into the loop circuit. Coil 9 is coupled to fixed coupling coil 7. This fixed coupling is employed for determining the sense of the line bearing. The switch 5 is arranged so as to transfer the open antenna 3 from normal connection with coil 11 to coil 7.

Figure 2:
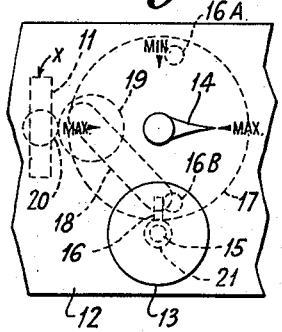
Fig. 2 is an outline or front panel view of the balancer coupling coil in one of the maximum coupling positions.
Figure 3:
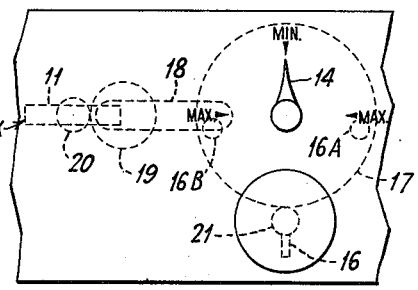
Fig. 3 is a view similar to that of Fig. 2, except that the coupling coil is in the minimum position.
Figure 4:
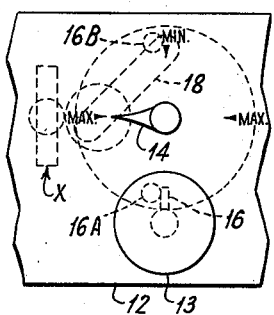
Fig. 4 is an outline front panel view similar to Figs. 2 and 3, except that the coil is shown in the other or reversed maximum position.

Figs. 2, 3 and 4 show the panel arrangement of the principal elements of the improved balancer which comprise panel 12, operating knob 13 and a pointer 14, the panel 12 being indicated at the top central portion thereof with the legend "min." and at the right and at the left with the legend "max.". Operating knob 13 is secured to a shaft 15 having located thereon a stop pin 16. The limit of motion is governed by pin 16 stopping on stops 16A and 16B. Stops 16A and 16B are eccentrically located on member 22 and may be adjusted by a screw driver inserted in the slot shown. The end of shaft 15 has located thereon a pinion gear 21 which meshes with large spur gear 17. A link 18 is pivotally fastened to a second spur gear 19, gear 19 engaging a second pinion 20 upon which the coupling coil 11 is secured. To more clearly indicate the coil position with respect to the legends "max." and "min." on the panel, a reference character "X" is indicated at one side of coupling coil 11.

Figure 5:
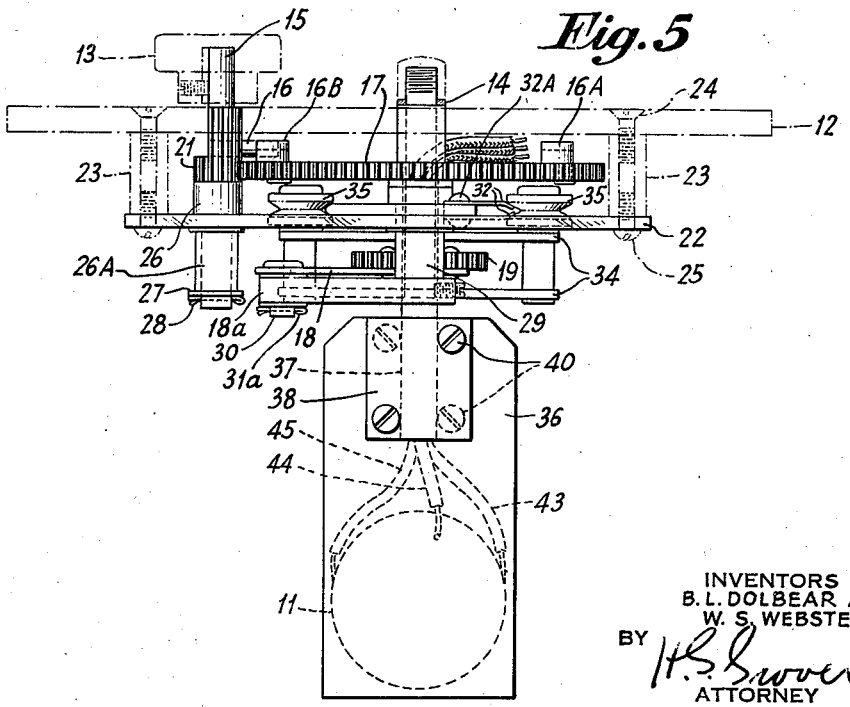
Fig. 5 is a plan view of the balancer rotor mechanism.

The mechanical arrangement of the driving gears and linkage system for rotating coil 11 is shown in greater detail in Figs. 5, 6 and 7. Referring now to these figures, there is shown mounted on panel 12 a metallic supporting member 22 which is substantially T-shaped and is secured to the panel by three mounting bushings or spacing members 23 and screws 24 and 25. At the lower end of mounting member 22 there is located a bearing 26 for operating shaft 15, to which pinion gear 21 and knob 13 are secured. Shaft 15 is retained in operative engagement with bearing 26 by means of a bushing 26A, a washer 27 and a cotter pin 28. In the central portion of mounting member 22 a second bushing or bearing 29 is provided for the shaft 14a for the large spur gear 17 and pointer 14. Links 18 and 18a are pivotally arranged by a pivot 30. Rivets 31 secure link 18 on the smaller spur gear 19. A cotter pin 31a retains links 18 and 18a in operative engagement. The central bearing for gear 19 is arranged to move or slide along a fixed track comprising rail member 33 secured to mounting member 22 and having spring member 32 riveted together by rivet 32A, the gear arrangement including gears 19 and 20 and coupling coil 11 being supported on four movable carriage members 34 which are provided with four rollers indicated as 35. Variable coupling coil 11 is mounted on an insulating panel 36 and is arranged for rotation by being secured to a rotating shaft 37 by members 38 and 39 which are securely bound together by screws 40. Shaft 37 rotates within a bushing 41 which is secured between carriage members 34. Pinion 20 is secured to shaft 37 by a pin 42, the teeth of pinion 20 engaging the spur gear 19. Electrical connections are made from coil 11 by means of flexible leads 43, 44 and 45. Lead 44 provides a tap on the winding so that more than one frequency band can be covered with the same coil. Loop coupling coils 9 and 10 are supported from a static shield 51 by a supporting strap 46 and spaced in their proper relation by spacing members 47. Strap member 46 is secured by means of spacers 48 passing through screws 49 and 50 to a fixed support angle 52 fastened to panel 22 by means of a screw 53. Interposed between coils 11 and 7 and directly in front of coils 9 and 10 is the static shield 51, allowing magnetic coupling to exist between coils 10 and 11 and between coils 7 and 9.

In the operation of this device, when the pointer 14 is in the position shown in Fig. 2, coupling coil 11 is at its maximum coupling position with respect to coil 10. Upon rotation of the knob 13, coil 11 is rotated and at the same time also moves away by angular movement of link 18 from the vertical plane indicated in Fig. 2, and continues to move away from coil 10 until it is in the minimum or horizontal plane shown in Fig. 3. After the pointer 14 passes the minimum position, the coil 11 then starts returning toward coil 10, continuing in this movement until the maximum position shown by pointer 14 in Fig. 4 is obtained. It will be noted that this position is identical with that of the maximum position shown in Fig. 2, except that the portion of the coil marked "X" is exactly one hundred and eighty degrees from that shown in Fig. 4.

When it is desired to determine the sense of a given bearing, switch 5 is operated so that antenna 3 and variometer 4 are connected to coil 7, through resistor 6. The open antenna circuit is now in resonance with the signal and voltages induced from coil 7 into coil 9 are in phase with the loop antenna signal voltages. By proper rotation of the loop antenna 1 from the null position, the sense of direction of the signal is now easily determined as described in a foregoing paragraph.

While only one modification of this invention is shown, it is distinctly understood that this application should not be limited to the device shown.

What is claimed is:

1. A radio direction finder balancer comprising a loop circuit having separate fixed coupling coils connected to each side of said loop circuit, an antenna coupling coil coupled to one of the fixed coils of said loop circuit, said antenna coupling coil being secured to a support member having mechanical means including a linkage system whereby said antenna coupling coil is arranged to move along its axis and rotate so as to variably couple energy in either one direction or another into said loop circuit, a second antenna coupling coil, and a switch and a resistance connected in series with an auxiliary antenna and said second antenna coupling coil.

2. A radio direction finder balancer comprising a loop circuit having separate fixed coupling coils connected to each side of said loop circuit, an antenna coupling coil coupled to one of the fixed coils of said loop circuit, said antenna coupling coil being secured to a support member having mechanical means including a linkage system and a train of gears whereby said antenna coupling coil is arranged to move along its axis and rotate so as to variably couple energy in either one direction or another into said loop circuit, a second antenna coupling coil, and a switch and a resistance connected in series with an auxiliary antenna and said second antenna coupling coil.

3. A radio direction finder balancer comprising a loop circuit having separate fixed coupling coils coupled to each side of said loop circuit, a fixed auxiliary antenna and a switching device, a fixed sense coil connected through said switching device to said auxiliary antenna and coupled to one of said separate coupling coils, a balance coil also connected through said switching device to said fixed antenna and inductively coupled to another of said separate coupling coils, and means for varying the coupling between said balance coil and at least one of said separate coupling coils so as to couple energy in said loop circuit in either one direction or another.

4. A radio direction finder balancer system comprising a rotatable loop antenna having separate fixed coupling coils connected to each side of said loop, a fixed auxiliary antenna and a switching device, a variable inductance coil connected in series with said switching device and said fixed auxiliary antenna, a fixed sense coil connected through said switching device to said fixed antenna and coupled to at least one of said separate fixed coupling coils, a balance coil connected to said switching device and inductively coupled to the other one of said separate fixed coupling coils, and separate means for varying the coupling between said balance coil and said last mentioned separate fixed coupling coil so as to couple energy in said rotatable loop antenna in either one direction or another.

5. A radio direction finder balancer system comprising a rotatable loop antenna having separate fixed coupling coils connected to each side of said loop, a fixed auxiliary antenna and a sense switching device, a variable inductance coil connected in series with said switching device and said fixed auxiliary antenna, a fixed sense coil connected through said switching device to said fixed antenna and coupled to at least one of said separate fixed coupling coils, a balance coil inductively coupled to the other one of said separate fixed coupling coils, a fixed inductance coil connected in series with said balance coil and said switching device to normally detune said auxiliary antenna when said sense switch connects said balance coil to said auxiliary antenna, and means for varying the coupling between said balance coil and said last mentioned inductance coil so as to couple energy in said rotatable loop in either one direction or the other.

6. A radio direction finder balancer comprising a loop circuit having separate fixed coupling coils connected to each side of said loop circuit, an antenna circuit having a coupling coil coupled to one of the fixed coils of said loop circuit, said antenna coupling coil being secured to a supporting member having mechanical means whereby said antenna coupling coil is arranged to move along its axis and rotate so as to variably couple antenna energy in either one direction or another into said loop circuit, a second antenna coupling coil, and a switch and a resistance connected in series with said antenna circuit and said second antenna coupling coil.

7. A radio direction finder balancer comprising a loop circuit having separate fixed coupling coils connected to each side of said loop circuit, an antenna circuit having a coupling coil coupled to one of the fixed coils of said loop circuit, said antenna coupling coil being secured to a supporting member having mechanical means whereby said antenna coupling coil is arranged to move along its axis and rotate so as to variably couple antenna energy in either one direction or another into said loop circuit, a second antenna coupling coil, a switch and a resistance connected in series with said antenna circuit and second antenna coupling coil, and a static shield interposed between said fixed coupling coils and said first and second mentioned antenna coupling coils.

8. A radio direction finder balancer comprising a loop circuit, a fixed support panel, a separate fixed coupling coil connected to each side of said loop circuit and mounted on said fixed support panel, a movable auxiliary antenna coil located to be in coupling relationship with at least one of said separate fixed coupling coils, means for moving said auxiliary antenna coil along its axis and also rotating it so as to variably couple energy in either one direction or another into said loop circuit, said means including a shaft, a pinion gear secured to said shaft, a second gear meshing with said pinion gear, a linkage member secured to said second gear, a third gear for moving said linkage member, a fourth gear engaging said third gear, and an operating knob secured to said fourth gear to vary the coupling relationship between said movable auxiliary antenna coil and said fixed coupling coil which is coupled thereto.

9. A radio direction finder balancer comprising a loop circuit, a fixed support panel, a separate fixed coupling coil connected to each side of said loop circuit and mounted on said fixed support panel, a movable auxiliary antenna coil located to be in coupling relationship with at least one of said separate fixed coupling coils, means for moving said auxiliary antenna coil along its axis and also rotating it so as to variably couple energy in either one direction or another into said loop circuit, said means including a track, a carriage member having a plurality of rollers engaging said track, a shaft carried by said carriage, a pinion gear secured to said shaft, a second gear meshing with said pinion gear, a linkage member secured to said second gear, a third gear for moving said linkage member, a fourth gear engaging said third gear, and an operating knob secured to said fourth gear to vary the coupling relationship between said movable auxiliary antenna coil and said fixed coupling coil which is coupled thereto.

BENJAMIN L. DOLBEAR.
WILLIAM S. WEBSTER.